(12) United States Patent
Zhou et al.

(10) Patent No.: US 8,412,828 B2
(45) Date of Patent: Apr. 2, 2013

(54) MEDIA RESOURCE MANAGEMENT METHOD AND DEVICE, EQUIPMENT AND SYSTEM THEREOF

(75) Inventors: Xufeng Zhou, Shenzhen (CN); Zongwu Wu, Shenzhen (CN); Xiangwen Zhu, Shenzhen (CN); Yan Mo, Shenzhen (CN); Yuan Li, Shenzhen (CN); Jiafeng Liu, Shenzhen (CN); Yuanlin Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 243 days.

(21) Appl. No.: 12/711,423

(22) Filed: Feb. 24, 2010

(65) Prior Publication Data

US 2010/0217870 A1     Aug. 26, 2010

(30) Foreign Application Priority Data

Feb. 24, 2009   (CN) .......................... 2009 1 0105639

(51) Int. Cl.
*G06F 15/173*   (2006.01)
(52) U.S. Cl. ...................................... 709/226
(58) Field of Classification Search .................. 709/203, 709/226
See application file for complete search history.

(56) References Cited

U.S. PATENT DOCUMENTS

| | | | |
|---|---|---|---|
| 4,887,265 A | 12/1989 | Felix | |
| 5,134,709 A | 7/1992 | Bi et al. | |
| 5,841,763 A | 11/1998 | Leondires et al. | |
| 6,182,061 B1 * | 1/2001 | Matsuzawa et al. | 707/737 |
| 7,281,051 B2 * | 10/2007 | Whynot et al. | 709/229 |
| 7,426,182 B1 | 9/2008 | Wang et al. | |
| 2004/0186904 A1 | 9/2004 | Oliveira | |
| 2006/0077967 A1 * | 4/2006 | Sienel et al. | 370/352 |

FOREIGN PATENT DOCUMENTS

| | | |
|---|---|---|
| CN | 1400825 A | 3/2003 |
| CN | 1756279 A | 4/2006 |

(Continued)

OTHER PUBLICATIONS

International Search Report in corresponding PCT Application No. PCT/US99/24384 (Feb. 3, 2000).

(Continued)

*Primary Examiner* — John MacIlwinen
(74) *Attorney, Agent, or Firm* — Leydig, Voit & Mayer, Ltd.

(57) ABSTRACT

A media resource management method, a media resource management device, a media resource management equipment, and a media resource management system are provided. The media resource management method includes the following steps. First, algorithm complexities of media resources are obtained according to a type of a service, in which the algorithm complexities are algorithm complexities of media resources required by the service. Next, an algorithm complexity of the service is determined according to the algorithm complexities of the media resources required by the service. Then, a capability of processing the service is determined according to the algorithm complexity of the service, and then the media resources are allocated. In the technical solution, through obtaining algorithm complexities of media resources according to a type of a service, determining an algorithm complexity of the service according to the algorithm complexities of media resources required by the service, and determining a capability of processing the service according to the algorithm complexity of the service, and then allocating the media resources, the utilization efficiency of media resources is improved.

10 Claims, 4 Drawing Sheets

FOREIGN PATENT DOCUMENTS

| CN | 101510922 B | 7/2011 |
|---|---|---|
| EP | 1643725 A1 | 4/2006 |
| WO | WO 00/22850 A1 | 4/2000 |

OTHER PUBLICATIONS

Extended European Search Report in corresponding European Application No. 10154539.0 (Jun. 30, 2010).

1st Office Action in corresponding European Application No. 10154539.0 (Apr. 6, 2011).

Chao et al., "Assigning service requests in Voice-over-Internet gateway multiprocessors," 2003, Elsevier, Ltd., Ontario, Canada.

"G.711—Pulse code modulation (PCM) of voice frequencies Appendix II: A comfort noise payload definition for ITU-T G.711 use in packet-based multimedia communication systems," Series G: Transmission Systems and Media, Digital Systems and Networks, Digital transmission systems—Terminal equipments—Coding of analogue signals by pulse code modulation, Feb. 2000, Appendix II, International Telecommunication Union, Geneva, Switzerland.

"G.723.1—Dual Rate Speech Coder for Multimedia Communications Transmitting at 5.3 and 6.3 kbit/s," General Aspects of Digital Transmission Systems, Mar. 1996, International Telecommunication Union, Geneva, Switzerland.

"G.723.1—Dual rate speech coder for multimedia communication transmitting at 5.3 and 6.3 kbit/s, Annex A: Silence compression scheme," Series G: Transmission Systems and Media, Digital Systems and Networks, Digital transmission systems—Terminal equipments—Coding of analogue signals by methods other than PCM, Nov. 1996, Annex A, International Telecommunication Union, Geneva, Switzerland.

"G.723.1—Dual rate speech coder for multimedia communication transmitting at 5.3 and 6.3 kbit/s, Annex B: Alternative specification based on floating point arithmetic," Series G: Transmission Systems and Media, Digital Systems and Networks, Digital transmission systems—Terminal equipments—Coding of analogue signals by methods other than PCM, Nov. 1996, Annex B, International Telecommunication Union, Geneva, Switzerland.

"G.723.1—Dual rate speech coder for multimedia communication transmitting at 5.3 and 6.3 kbit/s, Annex C: Scalable channel coding scheme for wireless applications," Series G: Transmission Systems and Media, Digital Systems and Networks, Digital transmission systems—Terminal equipments—Coding of analogue signals by methods other than PCM, Nov. 1996, Annex C, International Telecommunication Union, Geneva, Switzerland.

"G.729—Coding of Speech at 8kbit/s using Conjugate Structure Algebraic Code-Excited Linear Prediction (CS-ACELP)," General Aspects of Digital Transmission Systems, Mar. 1996, International Telecommunication Union, Geneva, Switzerland.

"G.729—Coding of Speech at 8kbit/s using Conjugate Structure Algebraic Code-Excited Linear Prediction (CS-ACELP), Annex A: Reduced complexity 8 kbit/s CS-ACELP speech codec," Series G: Transmission Systems and Media, Digital transmission systems—Terminal equipments—Coding of analogue signals by methods other than PCM, Nov. 1996, Annex A, International Telecommunication Union, Geneva, Switzerland.

"G.729—Coding of Speech at 8kbit/s using Conjugate Structure Algebraic Code-Excited Linear Prediction (CS-ACELP), Annex B: A silence compression scheme for G.729 optimized for terminals conforming to Recommendation V.70," Series G: Transmission Systems and Media, Digital Systems and Networks, Digital transmission systems—Terminal equipments—Coding of analogue signals by methods other than PCM, Nov. 1996, Annex B, International Telecommunication Union, Geneva, Switzerland.

"G.729—Coding of Speech at 8kbit/s using Conjugate Structure Algebraic Code-Excited Linear Prediction (CS-ACELP), Annex C: Reference floating-point implementation for G.729 CS-ACELP 8 kbit/s speech coding," Series G: Transmission Systems and Media, Digital Systems and Networks, Digital transmission systems—Terminal equipments—Coding of analogue signals by methods other than PCM, Sep. 1998, Annex C, International Telecommunication Union, Geneva, Switzerland.

"G.729—Coding of Speech at 8kbit/s using Conjugate Structure Algebraic Code-Excited Linear Prediction (CS-ACELP), Annex C+: Reference floating-point implementation for integrating G.729 CS-ACELP speech coding main body with Annexes B, D, and E," Series G: Transmission Systems and Media, Digital Systems and Networks, Digital transmission systems—Terminal equipments—Coding of analogue signals by methods other than PCM, Feb. 2000, Annex C+, International Telecommunication Union, Geneva, Switzerland.

"G.729—Coding of Speech at 8kbit/s using Conjugate Structure Algebraic Code-Excited Linear Prediction (CS-ACELP), Annex E: 11.8 kbit/s CS-ACELP speech coding algorithm," Series G: Transmission Systems and Media, Digital Systems and Networks, Digital transmission systems—Terminal equipments—Coding of analogue signals by methods other than PCM, Sep. 1998, Annex E, International Telecommunication Union, Geneva, Switzerland.

"G.729—Coding of Speech at 8kbit/s using Conjugate Structure Algebraic Code-Excited Linear Prediction (CS-ACELP), Annex F: Reference implementation of G.729 Annex B DTX functionality for Annex D," Series G: Transmission Systems and Media, Digital Systems and Networks, Digital transmission systems—Terminal equipments—Coding of analogue signals by methods other than PCM, Feb. 2000, Annex F, International Telecommunication Union, Geneva, Switzerland.

"G.729—Coding of Speech at 8kbit/s using Conjugate Structure Algebraic Code-Excited Linear Prediction (CS-ACELP), Annex G: Reference implementation of G.729 Annex B DTX functionality for Annex E," Series G: Transmission Systems and Media, Digital Systems and Networks, Digital transmission systems—Terminal equipments—Coding of analogue signals by methods other than PCM, Feb. 2000, Annex G, International Telecommunication Union, Geneva, Switzerland.

"G.729—Coding of Speech at 8kbit/s using Conjugate Structure Algebraic Code-Excited Linear Prediction (CS-ACELP), Annex H: Reference implementation of switching procedure between G.729 Annexes D and E," Series G: Transmission Systems and Media, Digital Systems and Networks, Digital transmission systems—Terminal equipments—Coding of analogue signals by methods other than PCM, Feb. 2000, Annex H, International Telecommunication Union, Geneva, Switzerland.

"G.729—Coding of Speech at 8kbit/s using Conjugate Structure Algebraic Code-Excited Linear Prediction (CS-ACELP), Annex I: Reference fixed-point implementation for integrating G.729 CS-ACELP speech coding main body with Annexes B, D, and E," Series G: Transmission Systems and Media, Digital Systems and Networks, Digital transmission systems—Terminal equipments—Coding of analogue signals by methods other than PCM, Feb. 2000, Annex I, International Telecommunication Union, Geneva, Switzerland.

"G.729—Coding of speech at 8 kbit/s using conjugate-structure algebraic-code-excited linear prediction (CS-ACELP), Appendix I: External synchronous reset performance for G.729 codecs in systems using external VAD/DTX/CNG," Series G: Transmission Systems and Media, Digital Systems and Networks, Digital terminal equipments—Coding of analogue signals by methods other than PCM, Jun. 2001, Appendix I, International Telecommunication Union, Geneva, Switzerland.

"G.729—Coding of speech at 8 kbit/s using conjugate-structure algebraic-code-excited linear prediction (CS-ACELP), Appendix II: G.729 Annex B enhancements in voice-over-IP applications—Option 1," Series G: Transmission Systems and Media, Digital Systems and Networks, Digital terminal equipments—Coding of analogue signals by methods other than PCM, Aug. 2005, Appendix II, International Telecommunication Union, Geneva, Switzerland.

"G.729—Coding of speech at 8 kbit/s using conjugate-structure algebraic-code-excited linear prediction (CS-ACELP), Appendix III: G.729 Annex B enhancements in voice-over-IP applications—Option 2," Series G: Transmission Systems and Media, Digital Systems and Networks, Digital terminal equipments—Coding of analogue signals by methods other than PCM, Aug. 2005, Appendix III, International Telecommunication Union, Geneva, Switzerland.

"G.723.1 Implementers Guide—Implementors' Guide for G.723.1 (Dual rate speech coder for multimedia communications transmitting at 5.3 & 6.3 kbit/s)," Series G: Transmission Systems and Media, Digital Systems and Networks, Digital terminal equipments—Coding of analogue signals by methods other than PCM, Oct. 25, 2002, International Telecommunication Union, Geneva, Switzerland.

"G.723.1 and G.729 Implementors' Guide," Series G: Transmission systems and media, digital systems and networks, Feb. 15, 2002, International Telecommunication Union, Geneva, Switzerland.

"G.729—Implementers' Guide for G.729 Annexes B, F, G, I and C+ (Coding of speech at 8 kbit/s using CS-ACELP)," Series G: Transmission Systems and Media, Digital Systems and Networks, Digital terminal equipments—Coding of analogue signals by methods other than PCM, Oct. 25, 2002, Implementers Guide, International Telecommunication Union, Geneva, Switzerland.

* cited by examiner

MEDIA RESOURCE MANAGEMENT METHOD AND DEVICE, EQUIPMENT AND SYSTEM THEREOF

CROSS-REFERENCE TO RELATED APPLICATION

This application claims priority to Chinese Patent Application No. 200910105639.5, filed Feb. 24, 2009, which is hereby incorporated by reference in its entirety.

FIELD OF THE TECHNOLOGY

The present invention relates to the field of communication technology, and more particularly to a media resource management method, a media resource management device, a media resource management equipment, and a media resource management system.

BACKGROUND OF THE INVENTION

Figure 1:
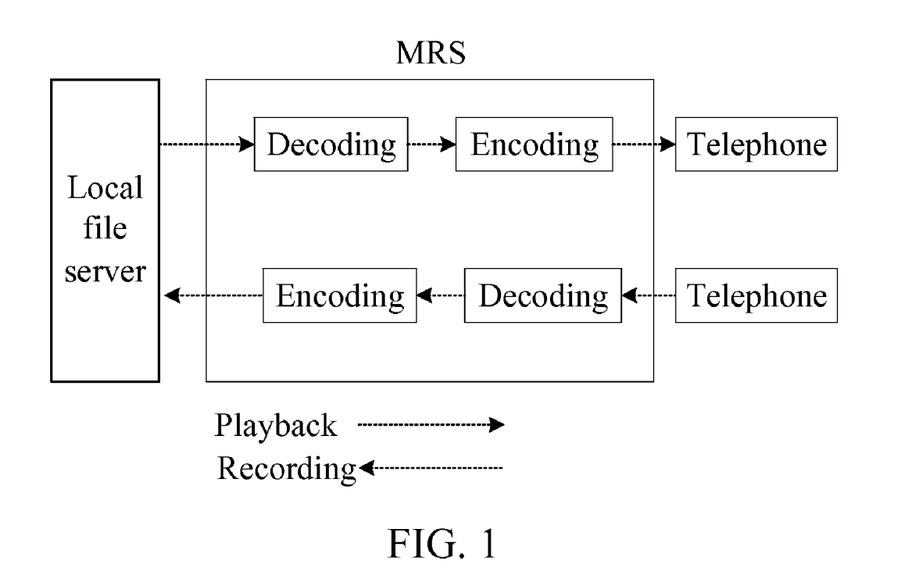
FIG. 1 is a schematic view of playback/recording services of a conventional MRS.

A media resource server (MRS) in the field of telecommunications generally provides media resources such as playback, recording, and double tone multiple frequency (DTMF) detection resources to realize interactive voice response (IVR) service functions and provides conference audio mixing resources to realize service functions associated with teleconference. Plenty of audio codec resources are allocated on the MRS to facilitate the multiple access of user terminals to the MRS at the same time. Besides, the codec supports various algorithm formats to cater to different media formats at the user terminals (for example, G.711 and G.729). Referring to FIG. 1, if an encoding format of a playback file is not consistent with a format at the user terminal, a playback decoder decodes an audio file on a local file server, then encodes the file into the format supported by the user terminal, and sends the encoded file to the user terminal. When an encoding format of speech data input by the user terminal to the MRS is not consistent with a format of a recording file, the input speech data is first decoded, then encoded into a format consistent with that of the recording file, and then stored in the local file server. The DTMF detection is adapted to detect a DTMF number dialed by a user after the input speech data is decoded, and implement subsequent service functions according to different DTMF numbers.

The media resources such as encoders, decoders, and DTMF detection resources are usually provided by a distributed media processing equipment (for example, a DSP typically) group. Each media processing equipment group includes more than one media processing equipment, and each media processing equipment is allocated with a certain number of media resources, including audio encoders, audio decoders, and DTMF detections, which are combined together to realize various functions associated with media services.

With the rapid development of communication services, the MRS is required to support more and more types of media resources, so that various types of media resources need to be integrated in single media processing equipment. Under the conditions of a set algorithm complexity of audio algorithm formats (indicated by MCPS: megacycles per second, an index adapted to measure a processor capability and an algorithm complexity) and a selected media processing equipment, how to employ a preferred resource management and allocation solution to fully utilize the media processing equipment resources to improve the channel density of a single media processing equipment group plays a critical role in achieving the purposes of saving the cost and enhancing the product competitiveness.

A resource management method in the conventional art is to bind encoding resources and decoding resources of the same audio algorithm for unified management. The algorithm complexity varies among different audio algorithm formats, and the number of channel resources (encoding resources+decoding resources) supported by one media processing equipment is calculated according to an audio algorithm format with the highest algorithm complexity. Specifically, an audio algorithm supporting three types of formats is taken as an example, among which the algorithm complexity of an algorithm format A is x, the algorithm complexity of an algorithm format B is y, and the algorithm complexity of an algorithm format C is z, $x<y<z$. If the available processing capability of one media processing equipment is P, the number of channel resources supported by the media processing equipment is $P/z$. Though the algorithm complexity x of the algorithm format A is lower than the algorithm complexity z of the algorithm format C, the number of channel resources supported by one media processing equipment in the algorithm format A can only be $P/z$. It is assumed that the resources allocated to one media processing equipment are all in the algorithm format A, and the actually wasted processing capability of the equipment is $P-x*(P/z)$. Taking actual data for example, the algorithm complexity of the algorithm format A is 2 MCPS, the algorithm complexity of the algorithm format B is 4 MCPS, the algorithm complexity of the algorithm format C is 5 MCPS, and the available processing capability of one media processing equipment is 500 MCPS, so that the number of channel resources supported by one media processing equipment is $500/5=100$ according to the conventional art. That is to say, even if the media processing equipment is only provided with the algorithm format A, the largest number of channel resources supported by the equipment is still 100. In contrast, theoretically, the largest number of channel resources supported by one media processing equipment in the algorithm format A is $500/2=250$.

Meanwhile, in the media resource management method of the conventional art, the encoding resources and the decoding resources of the same audio format are bound, and a digital signal codec channel is opened to correspond to the user during call accessing or service processing. In practice, the encoding resources and the decoding resources required by many services are not symmetrical, so that the allocation of encoding and decoding resources at the same time may cause severe waste of resources. What's worse, if the DTMF detection resources are further taken into account, the algorithm complexity of the DTMF detection resources also needs to be considered in the algorithm complexity of the channel calculation. In actual applications, the encoding/decoding resources, for example, playback decoding resources, adopted by some services do not need DTMF detection resources, so that the above method may further cause severe waste of media resources.

In view of the above, the resource management and allocation method provided in the conventional art results in serious waste of media resources.

SUMMARY OF THE INVENTION

Accordingly, the present invention is directed to a media resource management method, a media resource management device, a media resource management equipment, and a media resource management system, which are applicable to enhance a utilization efficiency of media resources.

In an embodiment, the present invention provides a media resource management method, which includes the following steps.

Algorithm complexities of media resources are obtained according to a type of a service, in which the algorithm complexities are algorithm complexities of media resources required by the service.

An algorithm complexity of the service is determined according to the algorithm complexities of the media resources required by the service.

A capability of processing the service is determined according to the algorithm complexity of the service, and then the media resources are allocated.

In an embodiment, the present invention provides a media resource management device, which includes a resource complexity acquisition module, a service complexity determination module, and a resource allocation module.

The resource complexity acquisition module is adapted to obtain algorithm complexities of media resources according to a type of a service, in which the algorithm complexities are algorithm complexities of media resources required by the service.

The service complexity determination module is adapted to determine an algorithm complexity of the service according to the algorithm complexities of the media resources required by the service.

The resource allocation module is adapted to determine a capability of processing the service according to the algorithm complexity of the service, and then allocate the media resources.

In an embodiment, the present invention provides a media resource management equipment, which includes a calling and service processing unit, a media resource management unit, and a media data transceiver unit.

The calling and service processing unit is adapted to receive a service instruction.

The media resource management unit is adapted to determine an algorithm complexity of a service according to a type of the service carried in the service instruction, in which the algorithm complexity of the service is determined according to obtained algorithm complexities of media resources required for processing the service, and then determine a capability of processing the service according to the algorithm complexity of the service, and then allocate the media resources.

The media data transceiver unit is adapted to obtain media data required by the media resources.

In an embodiment, the present invention provides a media resource management equipment, which includes a media resource management unit and a media processing unit.

The media resource management unit is adapted to determine an algorithm complexity of a service according to a type of the service carried in a service instruction, in which the algorithm complexity of the service is determined according to obtained algorithm complexities of media resources required for processing the service, and then determine a capability of processing the service according to the algorithm complexity of the service, and allocate the media resources.

The media processing unit is adapted to obtain media data required by the media resources, and implement service processing by using the media data.

In an embodiment, the present invention provides a media resource management system, which includes a calling and service processing unit, a media resource management unit, a media data transceiver unit, and at least one media processing unit.

The calling and service processing unit is adapted to receive a service instruction.

The media resource management unit is adapted to determine an algorithm complexity of a service according to a type of the service carried in the service instruction, in which the algorithm complexity of the service is determined according to obtained algorithm complexities of media resources required for processing the service, and then determine a capability of processing the service according to the algorithm complexity of the service, and allocate the media resources.

The media data transceiver unit is adapted to provide media data required by the media resources.

The at least one media processing unit is adapted to obtain the media data required by the media resources, and implement service processing by using the media data.

As seen from the above technical solutions of the embodiments of the present invention, algorithm complexities of media resources are obtained according to a type of a service, an algorithm complexity of the service is determined according to the algorithm complexities of media resources required by the service, and a capability of processing the service is determined according to the algorithm complexity of the service, and then the media resources are allocated. Therefore, the utilization efficiency of media resources is improved.

BRIEF DESCRIPTION OF THE DRAWINGS

To illustrate the technical solutions according to the embodiments of the present invention or in the conventional art more clearly, the accompanying drawings for describing the embodiments or the conventional art are introduced below briefly. The accompanying drawings in the following descriptions merely show some of the embodiments of the present invention, and persons of ordinary skill in the art can obtain other drawings according to the accompanying drawings without making creative efforts.

DETAILED DESCRIPTION OF THE EMBODIMENTS

The technical solutions of the embodiments of the present invention are completely described below clearly with reference to the accompanying drawings. Apparently, the embodiments in the following descriptions are merely a part of the embodiments of the present invention, rather than all the embodiments of the present invention. Persons of ordinary skill in the art can derive other embodiments based on the embodiments of the present invention without making creative efforts, which all fall within the scope of the present invention.

In the embodiments of the present invention, various media resources, such as audio encoding, audio decoding, DTMF detection, video encoding, and video decoding in different algorithm formats are included. In the embodiments of the present invention, the audio processing is taken as an example for illustration, and the method is also applicable to other types of media processing.

Figure 2:
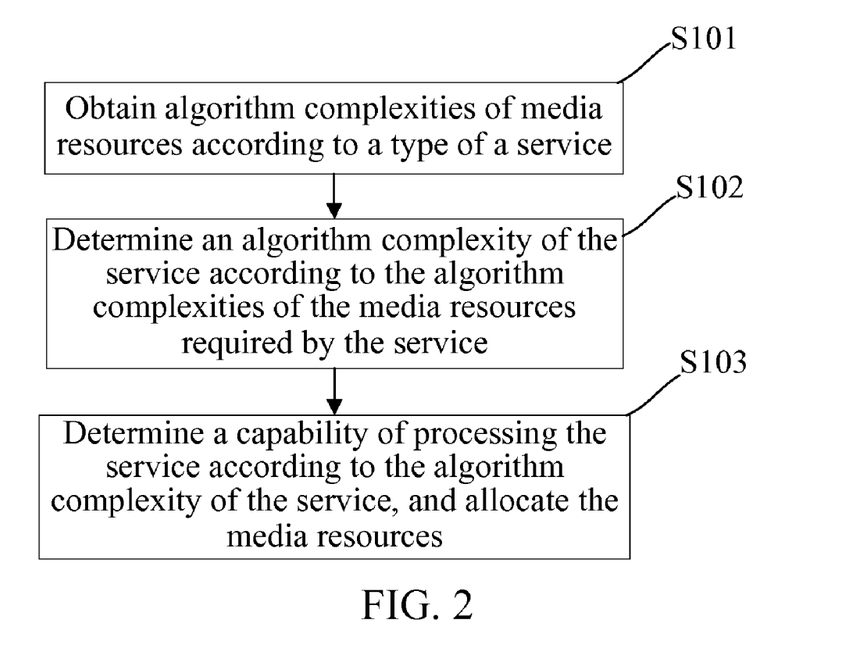
FIG. 2 is a flow chart of a media resource management method according to a first embodiment of the present invention.

In a first embodiment of the present invention, a media resource management method is provided, as shown in FIG. 2. The method includes the following steps.

In Step S101, algorithm complexities of media resources are obtained according to a type of a service, in which the algorithm complexities are algorithm complexities of media resources required by the service.

In Step S102, an algorithm complexity of the service is determined according to the algorithm complexities of the media resources required by the service.

In Step S103, a capability of processing the service is determined according to the algorithm complexity of the service, and the media resources are allocated.

In the method of this embodiment of the present invention, algorithm complexities of media resources are obtained according to a type of a service, an algorithm complexity of the service is determined according to the algorithm complexities of media resources required by the service, and a capability of processing the service is determined according to the algorithm complexity of the service, and then the media resources are allocated. Therefore, the utilization efficiency of media resources is improved.

Figure 3:
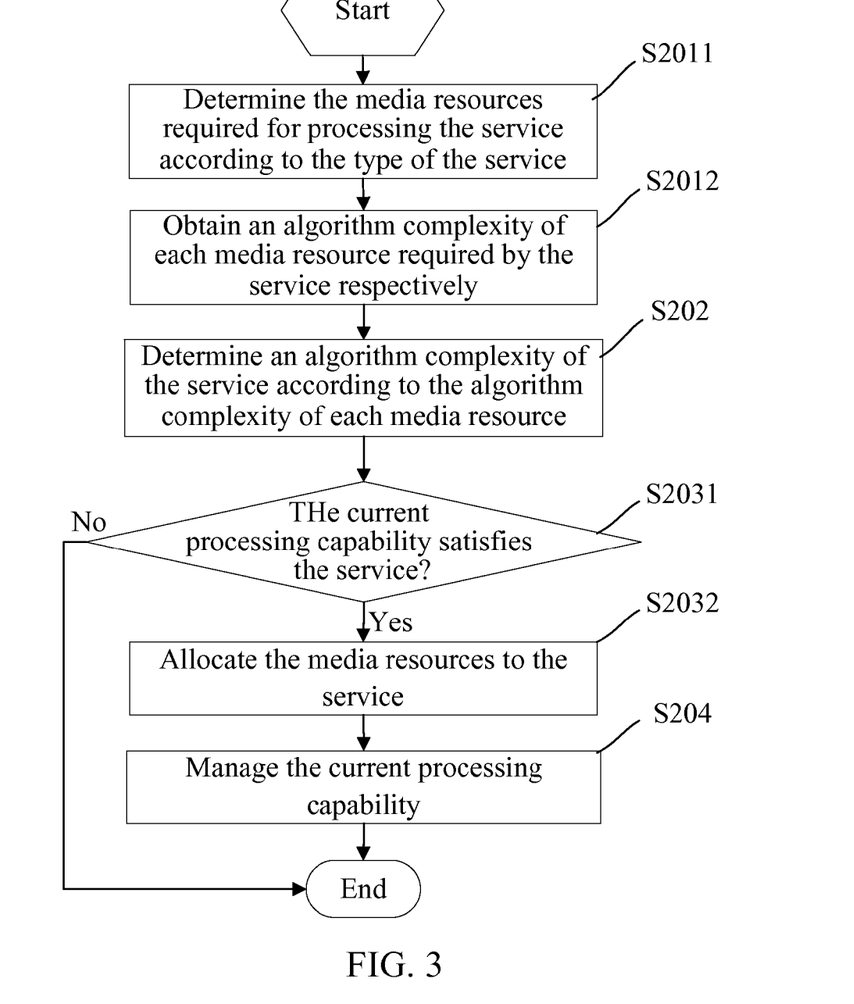
FIG. 3 is a flow chart of a media resource management method according to a second embodiment of the present invention.

In a second embodiment of the present invention, a media resource management method is provided, as shown in FIG. 3. The method includes the following steps.

In Step S201, algorithm complexities of media resources required by a service are obtained according to a type of the service.

The obtaining the algorithm complexities of the media resources required by the service according to the type of the service further includes determining the media resources required for processing the service, and respectively obtaining an algorithm complexity of each media resource required by the service.

In Step S2011, the media resources required for processing the service are determined according to the type of the service.

In the embodiment of the present invention, specific services to be processed may include various types of services such as a recording service or a playback service. Each type of service may require different media resources, for example, the same playback service may require both decoding resources and encoding resources at the same time, or merely require one of the two resources. Meanwhile, the encoding resources or the decoding resources may have different algorithm formats, for example, G.711 or G.729, and each media resource has its own algorithm complexity. Therefore, according to a specific service, one or more media resources may be required.

In the embodiment of the present invention, the type of a service to be processed is first determined, and then the media resources required by the service are determined according to the type of the service. The determining the media resources required by the specific type of service may be realized in various manners. For example, a received service instruction is identified to obtain the type of a service to be processed, and the required media resources are determined through identifying the specific type of the service. Specifically, if it is determined that the service to be processed is a recording service, encoding resources and decoding resources in a certain audio format and DTMF detection resources required by the recording service are determined through identifying the recording service. In an alternative embodiment, the specific type of the service and corresponding media resources required by the service are stored in an array or a table, and thus, once the type of the service is determined, the media resources required by the corresponding service are determined by looking up the array or table.

In the embodiment of the present invention, the encoding resources and the decoding resources in the same audio format are classified by granularity, and other types of media resources may also be classified by granularity in the same manner. The classification by granularity may be implemented based on the smallest granularity. Alternatively, the granularity size and media resources classified thereby may be dynamically adjusted according to actual requirements. During the specific allocation of resources, the resources are allocated upon demands according to the principle of demand assignment, thereby avoiding wastes of resources.

In Step S2012, an algorithm complexity of each media resource required by the service is respectively obtained.

In the embodiment of the present invention, the algorithm complexity data (with MCPS as the unit) of each media resource may be stored in an array or a table, so that the algorithm complexity of each media resource may be obtained by looking up the array or table. One or more arrays or tables may be required, which may be stored locally or stored at any place that can be visited over network. For a certain service such as a recording service, if it is determined in Step S2011 that the media resources required for processing the recording service include encoding resources and decoding resources in a certain audio format and DTMF detection resources, algorithm complexities of the encoding resources, the decoding resources, and the DTMF detection resources required by the recording service need to be respectively obtained from the array or table. In the array or table for storing the algorithm complexities of the media resources, the algorithm complexity information may be updated according to the adjustment of the type of the service and the adjustment of the media resources.

In Step S202, an algorithm complexity of the service is determined according to the algorithm complexity of each media resource.

Depending on a specific service, if the service only requires one media resource, the algorithm complexity of the media resource obtained in Step S201 serves as the algorithm complexity of the service; and if the service requires a plurality of media resources, the algorithm complexities of the media resources obtained in Step S201 are added up to serve as the algorithm complexity of the service. In an alternative embodiment, the sum of the algorithm complexities of the media resources may be further added with a margin to serve as the algorithm complexity of the service, so as to ensure the capability of processing the service. In an alternative embodiment, the algorithm complexity of each media resource may be weighted in a certain manner to serve as the algorithm complexity of the service. In view of the above, as long as the algorithm complexity of the service is determined based on the media resource with the smallest granularity, various determining manners can be adopted, and it is apparent to those skilled in the art that various common determining manners all fall within the protection scope of the present invention.

In Step S203, a capability of processing the service is determined according to the algorithm complexity of the service, and then the media resources are allocated.

In Step S2031, it is determined whether the current processing capability satisfies the service or not, and if yes, Step S2032 is performed; otherwise, the service is rejected, and the media resource management is ended.

In the embodiment of the present invention, the service is processed by a media processing unit, and the processing capability (with MCPS as the unit) of the media processing unit is also the capability of processing the media resources capable of being allocated to the media service. One or more media processing units exist in the system, and when more than one media processing unit exists in the system, the processing capability of the system is a total processing capability of the media processing units.

In the embodiment of the present invention, the algorithm complexity of the service to be processed is determined according to the media resources required by the service, and then is compared with a current processing capability of the media processing unit. If the current processing capability satisfies the requirement of processing the service, Step S2032 is performed; otherwise, the service is rejected, and the media resource management is ended.

The determining whether the current processing capability satisfies the service or not may be realized in various manners. In some embodiments, the algorithm complexity of the service determined in Step S202 is compared with the current processing capability of the media processing unit, so as to determine whether the current processing capability of the media processing unit satisfies the service or not, i.e., whether it is larger than or equal to the algorithm complexity of the service or not. If the processing capability is sufficiently high, Step S2032 is performed; otherwise, the service is rejected, and a failure response is returned to end the media resource management. In some embodiments, a table is created to record corresponding relations between the current processing capability and the algorithm complexity of each type of service or the algorithm complexity of each media resource, and it is determined whether the current processing capability satisfies the service or not by looking up the table.

In Step S2032, the media resources are allocated to the service.

In the embodiment of the present invention, a capability of processing the service is determined according to the algorithm complexity of the service, and the media resources are allocated, i.e., a corresponding media processing algorithm in the media processing unit is opened for the service.

The allocating the media resources for the service further includes selecting the media processing unit for allocating the media resources. When only one media processing unit is configured, the service is processed by the media processing unit. When a plurality of media processing units is configured, the media resources are allocated through considering the processing capability of each media processing unit and the coordination between the media processing units. The media processing service may be completely allocated to one media processing unit or to a plurality of media processing units. The media processing service may be randomly allocated to the media processing units, for example, it is first allocated to one media processing unit randomly, and then allocated to a next media processing unit when the processing capability of the previous media processing unit is fully occupied. In some embodiments, the media processing service is allocated to the media processing units according to a predetermined strategy. For example, the media processing services of a plurality of users are allocated to a plurality of media processing units, so as to realize load balancing; and the media processing service of the same user is allocated to the same media processing unit, so as to improve the processing efficiency through load concentration.

Figure 4:
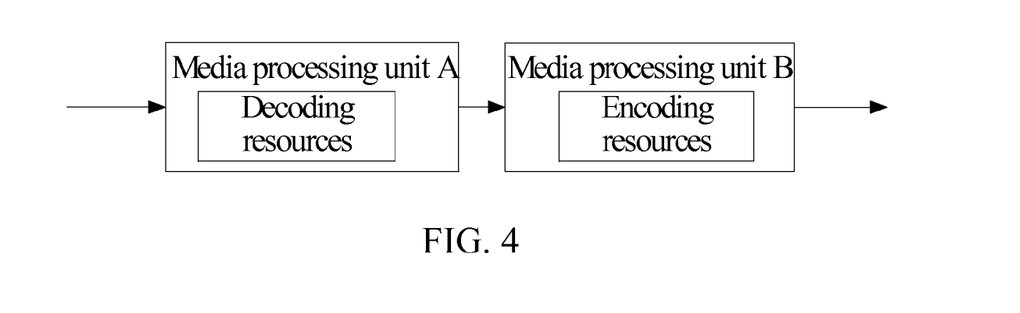
FIG. 4 is a schematic view of data transmission between media processing units according to an embodiment of the present invention.

In some embodiments, the plurality of media processing units is independent from each other. In some other embodiments, the plurality of media processing units is connected to each other, and data is exchanged between the media processing units, so as to realize overall planning, coordination, and utilization of media resources among the media processing units. For example, as shown in FIG. 4, for a service requiring both decoding resources and encoding resources, the decoding resources exclusively for decoding are allocated to a media processing unit A, and the encoding resources exclusively for encoding are allocated to a media processing unit B. A data stream of the service is decoded in A, and then transmitted to B for encoding, so as to realize the coordination and utilization of the media processing units, thereby improving the efficiency of the media processing units.

In the embodiment of the present invention, the algorithm complexity of the service to be processed is compared with the current processing capability. If the current processing capability satisfies the service, corresponding media resources are allocated, thereby ensuring making full use of the processing capability of the media processing unit. Furthermore, as the algorithm complexity of the service is obtained according to the algorithm complexities of the media resources required by the service, and the media resources are classified by granularity, the demand assignment is achieved, and the media resources are allocated upon demands when the media resources are allocated to the service, thereby avoiding wastes of resources.

In Step S204, the current processing capability is managed.

In some embodiments, in order to further enhance the utilization efficiency of the media resources and ensure the operating efficiency of the media processing task, a dynamic management needs to be performed on the processing capability of the media processing unit.

In the embodiment of the present invention, it is assumed that the current processing capability of the media processing unit is P. In some embodiments, one media processing unit is configured, and in this case, P represents a current processing capability of the media processing unit. In some embodiments, a plurality of media processing units is configured, and in this case, P represents a total current processing capability of the plurality of media processing units. In some embodiments, during the program initialization, the currently available processing capability of the media processing unit is set as a maximum available processing capability Pmax of the media processing unit. After the media resources are allocated to the media processing service in Step S203, the processing capability taken up by the media resources allocated to the service is subtracted from the current processing capability P of the media processing unit. Once the media processing task is completed, the media resources allocated to the service are restored, and the processing capability taken up by the restored media resources is added to the current processing capability P of the media processing unit.

In an alternative embodiment, the current processing capability of the media processing unit is managed by recording the already used processing capability of the media processing unit. During the initialization, the already used processing capability of the media processing unit is set as 0. After the media resources are allocated to the media processing service in Step S203, the processing capability taken up by the allocated media resources is added to the already used processing capability. Once the media processing task is completed, the allocated media resources are restored, and the processing capability taken up by the restored media resources is subtracted from the already used processing capability. In this embodiment, the current processing capability P of the media processing unit is obtained by subtracting the already used processing capability of the media processing unit from the maximum available processing capability Pmax of the media processing unit. In this embodiment, addition/subtraction operations are substantially performed on the current processing capability, which achieves the same effect as the previous embodiment in a different implementing manner. Other implementing manners may be obtained by those skilled in the art without making creative efforts, which all fall within the scope of the present invention.

In the method of this embodiment of the present invention, algorithm complexities of media resources are obtained according to a type of a service, an algorithm complexity of the service is determined according to algorithm complexities of media resources required by the service, and a capability of processing the service is determined according to the algorithm complexity of the service, and the media resources are allocated. Therefore, the utilization efficiency of media resources is improved.

Figure 5:
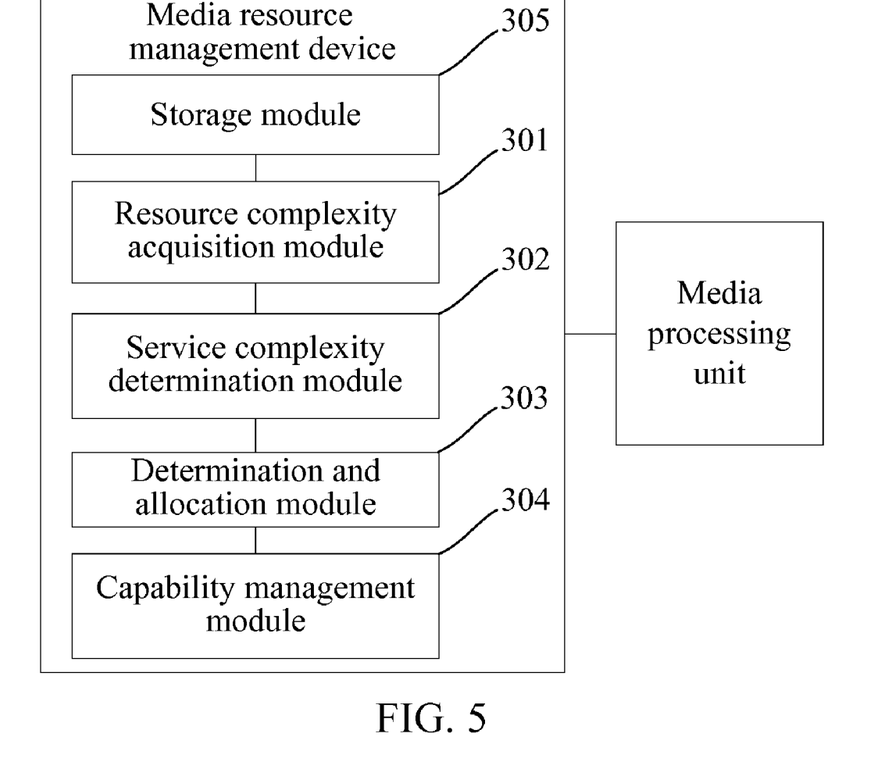
FIG. 5 is a schematic view of a media resource management device according to a third embodiment of the present invention.

Corresponding to the above media resource management method, a media resource management device is provided in a third embodiment of the present invention, as shown in FIG. 5. The device includes a resource complexity acquisition module 301, a service complexity determination module 302, and a determination and allocation module 303.

The resource complexity acquisition module 301 is adapted to obtain algorithm complexities of media resources according to a type of a service, in which the algorithm complexities are algorithm complexities of media resources required by the service.

The service complexity determination module 302 is adapted to determine an algorithm complexity of the service according to the algorithm complexities of the media resources required by the service.

The determination and allocation module 303 is adapted to determine a capability of processing the service according to the algorithm complexity of the service, and then allocate the media resources.

In the device of this embodiment of the present invention, algorithm complexities of media resources are obtained according to a type of a service, an algorithm complexity of the service is determined according to algorithm complexities of media resources required by the service, and a capability of processing the service is determined according to the algorithm complexity of the service, and the media resources are allocated. Therefore, the utilization efficiency of media resources is improved.

In the embodiment of the present invention, the determination and allocation module further includes: a capability determination module 3031, adapted to determine that the capability required for processing the service is not higher than the current processing capability according to the algorithm complexity of the service; and a resource allocation module 3032, adapted to acquire that the capability required for processing the service is not higher than the current processing capability, and allocate the media resources accordingly.

In the embodiment of the present invention, the media resource management device further includes a capability management module 304 adapted to subtract the capability required for processing the service from the current processing capability, and add the capability required for processing the service into the current processing capability after the service is finished.

In the embodiment of the present invention, the media resource management device further includes a storage module 305 adapted to store the algorithm complexities of the media resources, in which the stored algorithm complexities of the media resources include algorithm complexities of media resources required for processing the service.

The media resource management device of this embodiment is further illustrated below in combination with the media resource management method.

The resource complexity acquisition module 301 obtains the algorithm complexities of the media resources required by the service according to the type of the service. The obtaining the algorithm complexities of the media resources required by the service according to the type of the service further includes determining media resources required for processing the service, and respectively obtaining an algorithm complexity of each media resource required by the service.

The resource complexity acquisition module 301 determines the media resources required for processing the service according to the type of the service. In the embodiment of the present invention, the specific services to be processed may include a recording service, a playback service, and other types of services. Each type of service may require different media resources, for example, the same playback service may require both decoding resources and encoding resources at the same time, or merely require one of the two resources. Meanwhile, the encoding resources or the decoding resources may have different algorithm formats, for example, G.711 and G.729, and each media resource has its own algorithm complexity. Therefore, according to a specific service, one or more media resources may be required.

In the embodiment of the present invention, the resource complexity acquisition module 301 first determines a type of a service to be processed, and then determines media resources required by the service according to the type of the service. The determining the media resources required by the specific type of service may be realized in various manners. For example, a received service instruction is identified to obtain the type of a service to be processed, and the required media resources are determined through identifying the specific type of the service. If it is determined that the service to be processed is a recording service, encoding resources and decoding resources in a certain audio format and DTMF detection resources required by the recording service are determined through identifying the recording service. In an alternative embodiment, the specific type of the service and corresponding media resources required by the service are stored in an array or a table, and thus, once the type of the service is determined, the media resources required by the corresponding service are determined by looking up the array or table.

In the embodiment of the present invention, the encoding resources and the decoding resources in the same audio format are classified by granularity, and other types of media resources may also be classified by granularity in the same manner. The classification by granularity may be implemented based on the smallest granularity. Alternatively, the granularity size and media resources classified thereby may be dynamically adjusted according to actual requirements. During the specific allocation of resources, the resources are allocated upon demands according to the principle of demand assignment, thereby avoiding wastes of resources.

The resource complexity acquisition module 301 respectively obtains the algorithm complexity of each media resource required by the service. In the embodiment of the present invention, the algorithm complexity data (with MCPS as the unit) of each media resource may be stored in the storage module 305, and the stored algorithm complexities of the media resources include algorithm complexities of media resources required for processing the service, so that the resource complexity acquisition module 301 may obtain the algorithm complexity of each media resource by querying the storage module 305. Specifically, the storage module 305 may be realized in a form of an array or a table. One or more arrays or tables may be required, which may be stored locally or stored at any place that can be visited over network. For a certain service such as a recording service, if the resource complexity acquisition module 301 determines that media resources required for processing the recording service include encoding resources and decoding resources in a certain audio format and DTMF detection resources, algorithm complexities of the encoding resources, the decoding resources, and the DTMF detection resources required by the recording service need to be respectively obtained from the storage module 305. The storage module 305 for storing the algorithm complexities of the media resources may have the algorithm complexity information updated according to the adjustment of the type of the service and the adjustment of the media resources.

The service complexity determination module 302 determines the algorithm complexity of the service according to the algorithm complexity of each media resource. Depending on a specific service, if the service only requires one media resource, the algorithm complexity of the media resource obtained by the resource complexity acquisition module 301 serves as the algorithm complexity of the service; and if the service requires a plurality of media resources, the algorithm complexities of the media resources obtained by the resource complexity acquisition module 301 are added up to serve as the algorithm complexity of the service. In an alternative embodiment, the sum of the algorithm complexities of the media resources may be further added up with a margin to serve as the algorithm complexity of the service, so as to ensure the capability of processing the service. In an alternative embodiment, the algorithm complexity of each media resource may be weighted in a certain manner to serve as the algorithm complexity of the service. In view of the above, as long as the algorithm complexity of the service is determined based on the media resource with the smallest granularity, various determining manners can be adopted, and various common determining manners obtained by those skilled in the art all fall within the protection scope of the present invention.

The capability determination module 3031 determines whether the current processing capability satisfies the service or not, and if yes, the determination and allocation module 303 allocates the media resources; otherwise, the service is rejected, and the media resource management is ended.

In the embodiment of the present invention, the service is processed by a media processing unit, and the processing capability (with MCPS as the unit) of the media processing unit is also the capability of processing the media resources allocated to the media service. One or more media processing units may exist in the system, and when a plurality of media processing units is configured in the system, the processing capability of the system is a total processing capability of the plurality of media processing units.

In the embodiment of the present invention, the algorithm complexity of the service to be processed is determined according to the media resources required by the service, and then is compared with a current processing capability of the media processing unit. If the current processing capability satisfies the requirement of processing the service, the media resources are allocated; otherwise, the service is rejected, and the media resource management is ended.

The determining by the capability determination module 3031 whether the current processing capability satisfies the service or not may be realized in various manners. In some embodiments, the algorithm complexity of the service determined by the service complexity determination module 302 is compared with the current processing capability of the media processing unit, so as to determine whether the current processing capability of the media processing unit satisfies the service or not, i.e., whether it is larger than or equal to the algorithm complexity of the service or not. If the processing capability is sufficiently high, the media resources are allocated; otherwise, the service is rejected, and a failure response is returned to end the media resource management. In some embodiments, a table is created to record corresponding relations between the current processing capability and the algorithm complexity of each type of service or the algorithm complexity of each media resource, and the capability determination module 3031 determines whether the current processing capability satisfies the service or not by looking up the table.

In the embodiment of the present invention, the capability determination module 3031 determines a capability of processing the service according to the algorithm complexity of the service, and the resource allocation module 3032 allocates the media resources, i.e., opens a corresponding media processing algorithm in the media processing unit for the service.

The allocating by the resource allocation module 3032 the media resources includes selecting the media processing unit for allocating the media resources. When only one media processing unit is configured, the service is processed by the media processing unit. When a plurality of media processing units is configured, the media resources are allocated through considering the processing capability of each media processing unit and the coordination between the media processing units. The media processing service may be completely allocated to one media processing unit or to a plurality of media processing units. The media processing service may be randomly allocated to the media processing units, for example, it is first allocated to one media processing unit randomly, and then allocated to a next media processing unit when the processing capability of the previous media processing unit is fully occupied. In some embodiments, the media processing service is allocated to the media processing units according to a predetermined strategy. For example, the media processing services of a plurality of users are allocated to a plurality of media processing units, so as to realize load balancing; and the media processing service of the same user is allocated to the same media processing unit, so as to improve the processing efficiency through load concentration.

In some embodiments, the plurality of media processing units is independent from each other. In some other embodiments, the plurality of media processing units is connected to each other, and data is exchanged between the media processing units, so as to realize overall planning, coordination, and utilization of media resources between the media processing units. For example, as shown in FIG. 4, for a service requiring both decoding resources and encoding resources, the decoding resources exclusively for decoding are allocated to a media processing unit A, and the encoding resources exclusively for encoding are allocated to a media processing unit B. A data stream of the service is decoded in A, and then transmitted to B for encoding, so as to realize the coordination and utilization of the media processing units, thereby improving the efficiency of the media processing units.

In the embodiment of the present invention, the capability determination module 3031 compares the algorithm complexity of the service to be processed with the current processing capability. If the current processing capability satisfies the service, corresponding media resources are allocated by the resource allocation module 3032, thereby ensuring making full use of the processing capability of the media processing unit. Furthermore, as the algorithm complexity of the service is obtained according to the algorithm complexities of the media resources required by the service, and the media resources are classified by granularity, the demand assignment is achieved, and the media resources are allocated upon demands when the media resources are allocated to the service, thereby avoiding wastes of resources.

In some embodiments, in order to further enhance the utilization efficiency of the media resources and ensure the operating efficiency of the media processing task, the capability management module 304 performs a dynamic management on the processing capability of the media processing unit.

In the embodiment of the present invention, it is assumed that the current processing capability of the media processing unit is P. In some embodiments, one media processing unit is configured, and in this case, P represents a current processing capability of the media processing unit. In some embodiments, a plurality of media processing units is configured, and in this case, P represents a total current processing capability of the plurality of media processing units. In some embodiments, during the program initialization, the currently available processing capability of the media processing unit is set as a maximum available processing capability Pmax of the media processing unit. After the media resources are allocated to the media processing service, the capability management module 304 subtracts the processing capability taken up by the media resources allocated to the service from the current processing capability P of the media processing unit. Once the media processing task is completed, the capability management module 304 restores the media resources allocated to the service, and adds the processing capability taken up by the restored media resources to the current processing capability P of the media processing unit.

In some embodiments, the current processing capability of the media processing unit is managed by recording the already used processing capability of the media processing unit. During the initialization, the already used processing capability of the media processing unit is set as 0. After the media resources are allocated to the media processing service, the capability management module 304 adds the processing capability taken up by the allocated media resources to the already used processing capability. Once the media processing task is completed, the capability management module 304 restores the allocated media resources, and subtracts the processing capability taken up by the restored media resources from the already used processing capability. In this embodiment, the current processing capability P of the media processing unit is obtained by subtracting the already used processing capability of the media processing unit from the maximum available processing capability Pmax of the media processing unit. In this embodiment, addition/subtraction operations are substantially performed on the current processing capability, which achieves the same effect as the previous embodiment in a different implementing manner. Other implementing manners may be obtained by those skilled in the art without making creative efforts, which all fall within the scope of the present invention.

In the device of this embodiment of the present invention, algorithm complexities of media resources are obtained according to a type of a service, an algorithm complexity of the service is determined according to algorithm complexities of media resources required by the service, and a capability of processing the service is determined according to the algorithm complexity of the service, and the media resources are allocated. Therefore, the utilization efficiency of media resources is improved.

Figure 6:
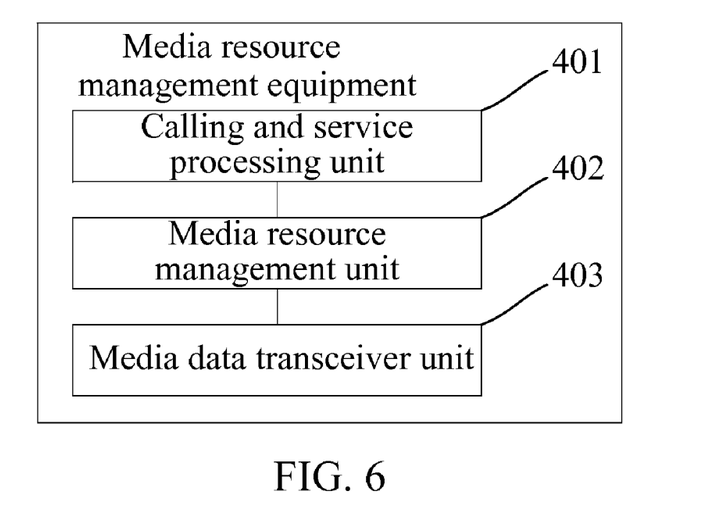
FIG. 6 is a schematic view of a media resource management equipment according to a fourth embodiment of the present invention.

Corresponding to the above media resource management method, a media resource management equipment is provided in a fourth embodiment of the present invention, as shown in FIG. 6. The equipment includes a calling and service processing unit 401, a media resource management unit 402, and a media data transceiver unit 403.

The calling and service processing unit 401 is adapted to receive a service instruction.

The media resource management unit 402 is adapted to determine an algorithm complexity of a service according to a type of the service carried in the service instruction, in which the algorithm complexity of the service is determined according to obtained algorithm complexities of media resources required for processing the service, and to determine a capability of processing the service according to the algorithm complexity of the service, and to allocate the media resources.

The media data transceiver unit 403 is adapted to obtain media data required by the media resources.

In the equipment of this embodiment of the present invention, an algorithm complexity of a service is determined through media resources classified by granularity, and a capability of processing the service is determined according to the algorithm complexity of the service, and the media resources are allocated and processed. Therefore, the utilization efficiency of media resources is improved.

In some embodiments, the media resource management equipment of this embodiment of the present invention further includes a media processing unit 404 adapted to implement service processing by using the media data.

In the embodiment of the present invention, the media resource management unit 402 further includes a resource complexity acquisition module, a service complexity determination module, and a determination and allocation module, and further includes a capability management module and a storage module. The determination and allocation module further includes a capability determination module and a resource allocation module. Detailed descriptions of the modules included in the media resource management unit 402 may be obtained with reference to the third embodiment of the present invention.

Figure 7:
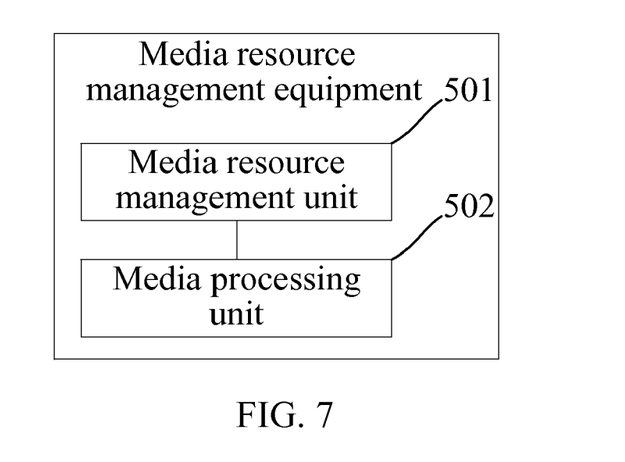
FIG. 7 is a schematic view of a media resource management equipment according to a fifth embodiment of the present invention.

Corresponding to the above media resource management method, a media resource management equipment is provided in a fifth embodiment of the present invention, as shown in FIG. 7. The equipment includes a media resource management unit 501 and a media processing unit 502.

The media resource management unit 501 is adapted to determine an algorithm complexity of a service according to a type of the service carried in a service instruction, in which the algorithm complexity of the service is determined according to obtained algorithm complexities of media resources required for processing the service, and to determine a capability of processing the service according to the algorithm complexity of the service, and to allocate the media resources.

The media processing unit 502 is adapted to obtain media data required by the media resources, and implement service processing by using the media data.

In the equipment of this embodiment of the present invention, an algorithm complexity of a service is determined through media resources classified by granularity, and a capability of processing the service is determined according to the algorithm complexity of the service, and the media resources are allocated and processed. Therefore, the utilization efficiency of media resources is improved.

In some embodiments, the media resource management equipment of this embodiment of the present invention further includes a calling and service processing unit 503 adapted to receive a service instruction and resolve the service instruction to obtain a service to be processed, and a media data transceiver unit 504 adapted to provide media data required by the media resources.

In the embodiment of the present invention, the media resource management unit 501 further includes a resource complexity acquisition module, a service complexity determination module, and a determination and allocation module, and further includes a capability management module and a storage module. The determination and allocation module further includes a capability determination module and a resource allocation module. Detailed descriptions of the modules included in the media resource management unit 501 may be obtained with reference to the third embodiment of the present invention.

Figure 8:
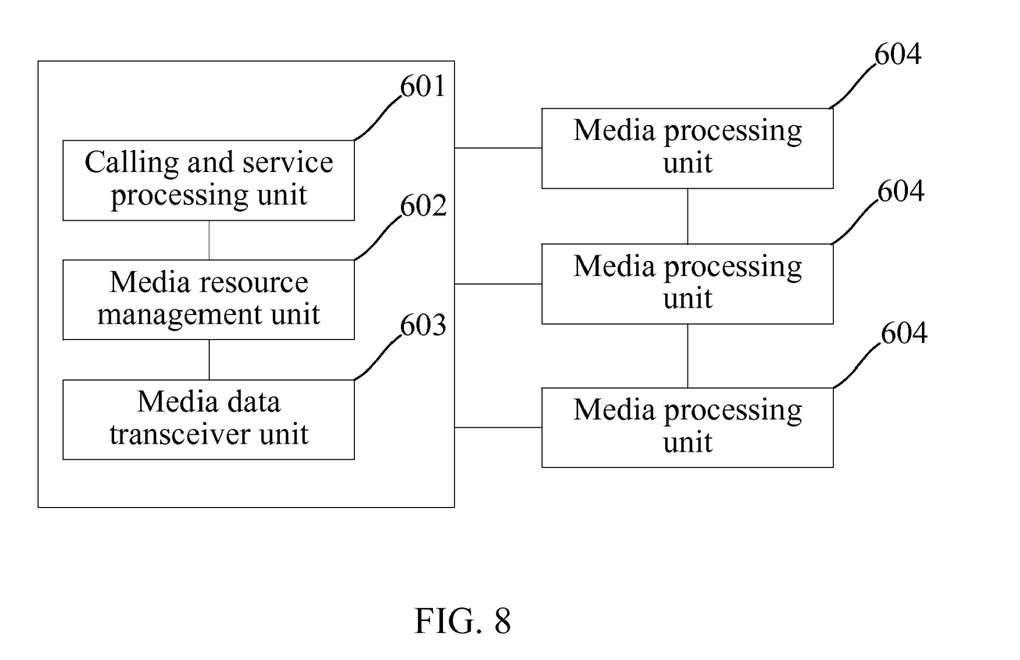
FIG. 8 is a schematic view of a media resource management system according to a sixth embodiment of the present invention.

A media resource management system is provided in a sixth embodiment of the present invention, as shown in FIG. 8. The system includes a calling and service processing unit 601, a media resource management unit 602, a media data transceiver unit 603, and at least one media processing unit 604.

The calling and service processing unit 601 is adapted to receive a service instruction.

The media resource management unit 602 is adapted to determine an algorithm complexity of a service according to a type of the service carried in the service instruction, in which the algorithm complexity of the service is determined according to obtained algorithm complexities of media resources required for processing the service, and to determine a capability of processing the service according to the algorithm complexity of the service, and to allocate the media resources.

The media data transceiver unit 603 is adapted to provide media data required by the media resources.

The at least one media processing unit 604 is adapted to obtain the media data required by the media resources, and implement service processing by using the media data.

In the system of this embodiment of the present invention, an algorithm complexity of a service is determined through media resources classified by granularity, and a capability of processing the service is determined according to the algorithm complexity of the service, and the media resources are allocated and processed. Therefore, the utilization efficiency of media resources is improved.

In the embodiment of the present invention, the media resource management unit 602 further includes a resource complexity acquisition module, a service complexity determination module, and a determination and allocation module, and further includes a capability management module and a storage module. The determination and allocation module further includes a capability determination module and a resource allocation module. Detailed descriptions of the modules included in the media resource management unit 602 may be obtained with reference to the third embodiment of the present invention.

The media resource management equipment and the media resource management system of the embodiments of the present invention are further illustrated below in combination with the media resource management method.

The calling and service processing unit receives a service instruction such as an external calling signaling or service control command via a service control interface, resolves the service instruction to obtain a service to be processed, and delivers the service to be processed to the media resource management unit for managing and allocating media resources for the service.

The media resource management unit determines an algorithm complexity of the service according to a type of the service carried in the service instruction, in which the algorithm complexity of the service is determined according to obtained algorithm complexities of media resources required for processing the service, and determines a capability of processing the service according to the algorithm complexity of the service, and allocates the media resources. The specific implementation is described as follows.

The media resource management unit obtains algorithm complexities of media resources required by the service according to the type of the service. The obtaining the algorithm complexities of the media resources required by the service according to the type of the service further includes determining media resources required for processing the service, and respectively obtaining an algorithm complexity of each media resource required by the service.

The media resource management unit determines the media resources required for processing the service according to the type of the service. In the embodiment of the present invention, specific services to be processed may include a recording service, a playback service, and other types of services. Each type of service may require different media resources, for example, the same playback service may require both decoding resources and encoding resources at the same time, or merely require one of the two resources. Meanwhile, the encoding resources or the decoding resources may have different algorithm formats, for example, G.711 and G.729, and each media resource has its own algorithm complexity. Therefore, according to a specific service, one or more media resources may be required.

In the embodiment of the present invention, the media resource management unit first determines a type of a service to be processed, and then determines media resources required by the service according to the type of the service. The determining the media resources required by the specific type of service may be realized in various manners. For example, a received service instruction is identified to obtain the type of a service to be processed, and the required media resources are determined through identifying the specific type of the service. If it is determined that the service to be processed is a recording service, encoding resources and decoding resources in a certain audio format and DTMF detection resources required by the recording service are determined through identifying the recording service. In an alternative embodiment, the specific type of the service and corresponding media resources required by the service are stored in an array or a table, and thus, once the type of the service is determined, media resources required by the corresponding service are determined by looking up the array or table.

In the embodiment of the present invention, the encoding resources and the decoding resources in the same audio format are classified by granularity, and other types of media resources may also be classified by granularity in the same manner. The classification by granularity may be implemented based on the smallest granularity. Alternatively, the granularity size and media resources classified thereby may be dynamically adjusted according to actual requirements. During the specific allocation of resources, the resources are allocated upon demands according to the principle of demand assignment, thereby avoiding wastes of resources.

The media resource management unit respectively obtains the algorithm complexity of each media resource required by the service. In the embodiment of the present invention, the algorithm complexity data (with MCPS as the unit) of each media resource may be stored in an array or a table, and the stored algorithm complexities of the media resources include algorithm complexities of media resources required for processing the service, so that the algorithm complexity of each media resource may be obtained by querying. One or more arrays or tables may be required, which may be stored locally or stored at any place that can be visited over network. For a certain service such as a recording service, if the media resource management unit determines that the media resources required for processing the recording service include encoding resources and decoding resources in a certain audio format and DTMF detection resources, algorithm complexities of the encoding resources, the decoding resources, and the DTMF detection resources required by the recording service need to be respectively obtained. The array or table for storing the algorithm complexities of the media resources may have the corresponding algorithm complexity information updated according to the adjustment of the type of the service and the adjustment of the media resources.

The media resource management unit determines the algorithm complexity of the service according to the algorithm complexity of each media resource. Depending on a specific service, if the service only requires one media resource, the obtained algorithm complexity of the media resource serves as the algorithm complexity of the service; and if the service requires a plurality of media resources, the obtained algorithm complexities of the media resources are added up to serve as the algorithm complexity of the service. In an alternative embodiment, the sum of the algorithm complexities of the media resources may be further added up with a margin to serve as the algorithm complexity of the service, so as to ensure the capability of processing the service. In an alternative embodiment, the algorithm complexity of each media resource may be weighted in a certain manner to serve as the algorithm complexity of the service. In view of the above, as long as the algorithm complexity of the service is determined based on the media resource with the smallest granularity, various determining manners can be adopted, and various common determining manners obtained by those skilled in the art all fall within the protection scope of the present invention.

The media resource management unit determines whether the current processing capability satisfies the service or not, and if yes, the media resources are allocated; otherwise, the service is rejected, and the media resource management is ended.

In the embodiment of the present invention, the service is processed by the media processing unit, and the processing capability (with MCPS as the unit) of the media processing unit is also the capability of processing the media resources allocated to the media service. One or more media processing units may exist in the system. When only one media processing unit is configured, the media processing unit may be integrated in the media resource management equipment of the embodiment of the present invention, i.e., serving as a media processing unit of the media resource management equipment. When a plurality of media processing units is configured, the processing capability of the system is a total processing capability of the plurality of media processing units.

In the embodiment of the present invention, the algorithm complexity of the service to be processed is determined according to the media resources required by the service, and then is compared with a current processing capability of the media processing unit. If the current processing capability satisfies the requirement of processing the service, the media resources are allocated; otherwise, the service is rejected, and the media resource management is ended.

The determining by the media resource management unit whether the current processing capability satisfies the service or not may be realized in various manners. In some embodiments, the above determined algorithm complexity of the service is compared with the current processing capability of the media processing unit, so as to determine whether the current processing capability of the media processing unit satisfies the service or not, i.e., whether it is larger than or equal to the algorithm complexity of the service or not. If the processing capability is sufficiently high, the media resources are allocated; otherwise, the service is rejected, and a failure response is returned to end the media resource management. In some embodiments, a table is created to record corresponding relations between the current processing capability and the algorithm complexity of each type of service or the algorithm complexity of each media resource, and the media resource management unit determines whether the current processing capability satisfies the service or not by looking up the table.

In the embodiment of the present invention, the media resource management unit determines a capability of processing the service according to the algorithm complexity of the service, and allocates the media resources, i.e., opens a corresponding media processing algorithm in the media processing unit for the service.

The allocating by the media resource management unit the media resources includes selecting the media processing unit for allocating the media resources. When only one media processing unit is configured, the service is processed by the media processing unit. When a plurality of media processing units is configured, the media resources are allocated through considering the processing capability of each media processing unit and the coordination between the media processing units. The media processing service may be completely allocated to one media processing unit or to a plurality of media processing units. The media processing service may be randomly allocated to the media processing units, for example, it is first allocated to one media processing unit randomly, and then allocated to a next media processing unit when the processing capability of the previous media processing unit is fully occupied. In some embodiments, the media processing service is allocated to the media processing units according to a predetermined strategy. For example, the media processing services of a plurality of users are allocated to a plurality of media processing units, so as to realize load balancing; and the media processing service of the same user is allocated to the same media processing unit, so as to improve the processing efficiency through load concentration.

In the embodiment of the present invention, after selecting the media processing unit for allocating the media resources, the media resource management unit sends allocation information to the media data transceiver unit, the media data transceiver unit forwards media data received via a media data interface to the media processing unit for allocating the media resources, and the media processing unit processes the media data, in which the media data is media data required by the allocated media resources. In some embodiments, the media resource management unit may send the allocation information to the calling and service processing unit, the calling and service processing unit controls the media data transceiver unit or forwards the allocation information to the media data transceiver unit, so as to enable the media data transceiver unit to forward media data received via a media data interface to the media processing unit for allocating the media resources, and then the media processing unit processes the media data.

In some embodiments, the plurality of media processing units is independent from each other. In some other embodiments, the plurality of media processing units is connected to each other, and data is exchanged between the media processing units, so as to realize overall planning, coordination, and utilization of media resources between the media processing units. For example, as shown in FIG. 4, for a service requiring both decoding resources and encoding resources, the decoding resources exclusively for decoding are allocated to a media processing unit A, and the encoding resources exclusively for encoding are allocated to a media processing unit B. A data stream of the service is decoded in A, and then transmitted to B for encoding, so as to realize the coordination and utilization of the media processing units, thereby improving the efficiency of the media processing units.

In some embodiments, when the system includes a plurality of media processing units, one or more media processing units among the plurality of media processing units may further include a media resource management module respectively. The function of the media resource management module is basically the same as that of the media resource management unit in the embodiment of the present invention, which is adapted to realize the media resource management for a single media processing unit. The redundancy configuration of the media resource management module further ensures a highly-efficient normal operation of the media processing unit, and also facilitates an effective utilization of the media resources.

In the embodiment of the present invention, the media resource management unit compares the algorithm complexity of the service to be processed with the current processing capability. If the current processing capability satisfies the service, corresponding media resources are allocated, thereby ensuring making full use of the processing capability of the media processing unit. Furthermore, as the algorithm complexity of the service is obtained according to the algorithm complexities of the media resources required by the service, and the media resources are classified by granularity, the demand assignment is achieved, and the media resources are allocated upon demands when the media resources are allocated to the service, thereby avoiding wastes of resources.

In some embodiments, in order to further enhance the utilization efficiency of the media resources and ensure the operating efficiency of the media processing task, a dynamic management needs to be performed on the processing capability of the media processing unit.

In the embodiment of the present invention, it is assumed that the current processing capability of the media processing unit is P. In some embodiments, one media processing unit is configured, and in this case, P represents a current processing capability of the media processing unit. In some embodiments, a plurality of media processing units is configured, and in this case, P represents a total current processing capability of the plurality of media processing units. In some embodiments, during the program initialization, the currently available processing capability of the media processing unit is set as a maximum available processing capability $P_{max}$ of the media processing unit. After the media resources are allocated to the media processing service, the media resource management unit subtracts the processing capability taken up by the media resources allocated to the service from the current processing capability P of the media processing unit. Once the media processing task is completed, the media resource management unit restores the media resources allocated to the service, and adds the processing capability taken up by the restored media resources to the current processing capability P of the media processing unit.

In some embodiments, the current processing capability of the media processing unit is managed by recording the already used processing capability of the media processing unit. During the initialization, the already used processing capability of the media processing unit is set as 0. After the media resources are allocated to the media processing service, the processing capability taken up by the allocated media resources is added to the already used processing capability. Once the media processing task is completed, the allocated media resources are restored, and the processing capability taken up by the restored media resources is subtracted from the already used processing capability. In this embodiment, the current processing capability P of the media processing unit is obtained by subtracting the already used processing capability of the media processing unit from the maximum available processing capability $P_{max}$ of the media processing unit. In this embodiment, addition/subtraction operations are substantially performed on the current processing capability, which achieve the same effect as the previous embodiment in a different implementing manner. Other implementing manners may be obtained by those skilled in the art without making creative efforts, which all fall within the scope of the present invention.

The media processing equipment of the embodiment of the present invention may be any equipment capable of implementing media processing and providing media resources, such as various chips, including DSP, or CPU, or other equipment capable of implementing media processing.

In the equipment and the system of the embodiments of the present invention, an algorithm complexity of a service is determined through media resources classified by granularity, and a capability of processing the service is determined according to the algorithm complexity of the service, and the media resources are allocated and processed. Therefore, the utilization efficiency of media resources is improved.

Those of ordinary skill in the art should understand that, all of or a part of processes in the method according to the above embodiments may be implemented by a computer program instructing relevant hardware. The program may be stored in a computer readable storage medium. When the program is executed, the processes of the method according to the embodiments of the present invention are performed. The storage medium may be a magnetic disk, an optical disk, a read-only memory (ROM), or a random access memory (RAM), and the like.

The above embodiments are merely some of the embodiments of the present invention. Those skilled in the art can make various modifications or variations without departing from the spirit and scope of the present invention based on the disclosure of the application document.

What is claimed is:

1. A media resource management method, wherein the method comprises:

obtaining, via a media resource management device, algorithm complexities of a plurality of media resources required by a service according to a service type carried in a service instruction; wherein the plurality of media resources includes two or more selected from audio encoding, audio decoding, double tone multiple frequency (DTMF) detection, video encoding, and video decoding in different algorithm formats;

determining, via the media resource management device, an algorithm complexity of the service by implementing one step of the group consisting of:
(a) adding up the algorithm complexities of the plurality of media resources required by the service,
(b) adding the sum of the algorithm complexities of the plurality of media resources with a margin, and
(c) adding up weighted algorithm complexity of each of the plurality of media resources required by the service;

determining, via the media resource management device, whether a current processing capability of at least one media processing unit is larger than or equal to the algorithm complexity of the service; and allocating, via the media resource management device, the plurality of media resources to the service if the current processing capability of the at least one media processing unit is larger than or equal to the algorithm complexity of the service.

2. The method according to claim 1, wherein the step of obtaining algorithm complexities of media resources required by a service according to a service type comprises:

searching a storage module that is configured to store algorithm complexity information of the plurality of media resources; and obtaining the plurality of algorithm complexities of the media resources from the storage module.

3. The method according to claim 1, wherein the method further comprises:

after the media resources are allocated, recording the remaining processing capabilities of the at least one media processing unit as the current processing capabilities of the at least one media processing unit.

4. The method according to claim 3, wherein the method further comprises:

restoring the allocated media resources when a media processing task is completed, and recording the current processing capabilities to reflect their recovery by a corresponding value.

5. A media resource management device, comprising a memory, and a processor connected to the memory configured to:

obtain algorithm complexities of plurality of media resources required by a service according to a service type carried in a service instruction; wherein the plurality of media resources include two or more selected from audio encoding, audio decoding, double tone multiple frequency (DTMF) detection, video encoding, and video decoding in different algorithm formats;

determine an algorithm complexity of the service by implementing one step of the group consisting of:
(a) adding up the algorithm complexities of the plurality of media resources required by the service,
(b) adding the sum of the algorithm complexities of the plurality of media resources with a margin, and
(c) adding up weighted algorithm complexity of each of the plurality of media resources required by the service; and determine whether the current processing capability of the at least one media processing unit is larger than or equal to the algorithm complexity of the service, and allocate the plurality of the media resources to the service if the current processing capability of the at least one media processing unit is larger than or equal to the algorithm complexity of the service.

6. The media resource management device according to claim 5, wherein the processor connected to the memory is further configured to:

reflect current process capability of the at least one media processing unit according to the media resources allocated and not allocated.

7. A media resource management apparatus, comprising a memory, and a processor connected to the memory configured to:

obtain algorithm complexities of a plurality of media resources required by a service according to a service type carried in a service instruction; wherein the plurality of media resources include two or more selected from audio encoding, audio decoding double tone multiple frequency (DTMF) detection, video encoding, and video decoding in different algorithm formats;

determine an algorithm complexity of the service by implementing one step of the group consisting of:
(a) adding up the algorithm complexities of the plurality of media resources required by the service,
(b) adding the sum of the algorithm complexities of the plurality of media resources with a margin, and
(c) adding up weighted algorithm complexity of each of the plurality of media resources required by the service;

determine whether the current processing capability of the at least one media processing unit is larger than or equal to the algorithm complexity of the service; and allocate the plurality of media resources to the service if the current processing capability of the at least one media processing unit is larger than or equal to the algorithm complexity of the service; and obtain media data required by the media resources.

8. The media resource management apparatus according to claim 7, wherein the processor connected to the memory is further configured to receive the service instruction.

9. The media resource management apparatus according to claim 7, wherein the processor connected to the memory is further configured to reflect current process capability of the at least one media processing unit according to the media resources allocated and not allocated.

10. A media resource management system, wherein the media resource management system comprises:

a calling and service processor, configured to receive a service instruction via a service control interface, resolve the service instruction to obtain a service to be processed, and deliver the service to be processed to a media resource management unit;

the media resource management unit, configured to obtain algorithm of a plurality of media resources required by the service according to a type of the service to be processed; wherein the plurality of media resources include two or more selected from audio encoding, audio decoding, double tone multiple frequency (DTMF) detection, video encoding, and video decoding in different algorithm formats;

determine an algorithm complexity of the service by implementing one step of the group consisting of:
(a) adding up the algorithm complexities of the plurality of media resources required by the service,
(b) adding the sum of the algorithm complexities of the plurality of media resources with a margin, and
(c) adding up weighted algorithm complexity of each of the plurality of media resources required by the service;

determine whether a current processing capability of at least one media processing unit is larger than or equal to the algorithm complexity of the service or not; and allocate the plurality of media resources to the service if the current processing capability of the at least one media processing unit is larger than or equal to the algorithm complexity of the service, wherein the allocating the plurality of media resources includes selecting a media processing unit for allocating the plurality of media resources from the at least one media processing unit;

a media data transceiver unit, configured to receive media data via a media data interface and provide the media data required by the media resources to the media processing unit selected by the media resource management unit; and the at least one media processing unit, configured to obtain the media data required by the media resources, and implement service processing by using the media data.

\* \* \* \* \*

UNITED STATES PATENT AND TRADEMARK OFFICE
CERTIFICATE OF CORRECTION

PATENT NO. : 8,412,828 B2
APPLICATION NO. : 12/711423
DATED : April 2, 2013
INVENTOR(S) : Zhou et al.

Page 1 of 1

It is certified that error appears in the above-identified patent and that said Letters Patent is hereby corrected as shown below:

In the Claims

Column 22, line 61, "algorithm of" should read -- algorithm complexities of --.

Signed and Sealed this
Sixteenth Day of July, 2013

Teresa Stanek Rea
*Acting Director of the United States Patent and Trademark Office*